Patented Jan. 1, 1952

2,580,496

UNITED STATES PATENT OFFICE 2,580,496

SEPARATION OF ROSIN ACIDS

Harold H. Zeiss, Tenafly, N. J., assignor, by mesne assignments, to The Fulwal Chemical Corporation, New York, N. Y., a corporation of Delaware No Drawing. Application July 14, 1948,
Serial No. 38,760

7 Claims. (Cl. 260—100)

This invention relates to separation of rosin acids and is concerned with two phases of such separation, one phase providing for separation of mixed rosin acids from rosin materials containing other constituents, and the other phase providing for separation of a given rosin acid from a mixture of rosin acids.

The invention is of especial applicability in the treatment of disproportionated rosins to isolate therefrom dehydroabietic acid of high purity.

One of the principal objects of the invention is the provision of an effective and low cost method for securing dehydroabietic acid.

As is known, pine rosin contains abietic acid as its principal constituent. Such rosin may be disproportionated by a number of known treatments, for instance by treatment with palladium-charcoal. The product of such treatment comprises a mixture of dehydroabietic acid, dihydroabietic acid, and tetrahydroabietic acid, together with certain other minor constituents which for convenience are referred to herein as "neutrals." In a typical product of this type the dehydroabietic acid may comprise from about 50 to 55%, the hydroabietic acids may comprise from about 33 to 38%, and the additional constituents about 12%. The hydroabietic acids are believed to include various isomers of dihydroabietic acid and tetrahydroabietic acid. The neutrals include hydrocarbons and compounds of phenolic character.

In its application to disproportionated rosin, the preferred practice of the invention provides for treatment first to separate the neutrals from the rosin acid constituents, and second for separation of dehydroabietic acid from the remaining rosin acids. This is accomplished in a typical treatment according to the following procedure:

The disproportionated rosin is dissolved in an aqueous alkaline solution to thereby form a solution of the corresponding alkali salts of the rosin acids present. The quantity of alkali present should be sufficient to react only with the rosin acids present. This is important since certain of the so-called "neutral" constituents are reactive with alkali. However, since the carboxylic acid groups of the rosin acids are of a more acidic character than the phenolic groups present in some of the constituents of the "neutrals," the former are more reactive with the alkali and a selective reaction therefore occurs in favor of the rosin acids.

The solution thus prepared contains the rosin acid salts as solute but with the neutrals in an undissolved state. The solution is then extracted with ether, and after separation of the ether layer, there is secured a clear solution of the salts of the mixed rosin acids.

The second phase of treatment is thereafter applied to the solution. This second phase of treatment involves a separation by fractional acidification, which is effective because of the fact that the several rosin acids present manifest differences in acid strength. To effect this fractional acidification, a predetermined quantity of hydrochloric acid is added to the solution to thereby split certain of the rosin acid salts and cause the corresponding rosin acids to precipitate. These are then separated by filtration. Subsequently, additional hydrochloric acid is added to effect precipitation of other rosin acids present which may also be recovered by filtration.

By following the foregoing fractional acidification procedure, various different fractions may be obtained which are rich in content of individual rosin acids.

I have found that the hydroabietic acids present in disproportionated rosin will precipitate prior to the separation of the dehydroabietic acid, during the course of the stage-by-stage acidification of the solution. I have found, moreover, that during very gradual acidification of the solution the resultant drop in pH value is characterized by a number of steps (at which the drop levels off temporarily), and that these steps in the descending curve of the pH value correspond to the values at which individual fractions are precipitated. I have still further found that the steps of the fractional acidification may be regulated so that upon the addition of an initial measured quantity of acid virtually all of the hydroabietic acids may be precipitated, leaving a solution in which the rosin acid salts remaining may comprise as much as 87% dehydroabietic acid salts. This rosin acid constituent may be recovered from the solution in any desired form and used as such. On the other hand, if dehydroabietic acid of still greater purity is desired, another measured quantity of acid may be added to the solution, slightly less in amount than that required to react with all of the salts remaining, and when this is done the resultant rosin acid precipitate may contain as high as 98% dehydroabietic acid. From this it will be seen that a minor fraction of some constituent other than dehydroabietic acid is still present even after the selective separation of the hydroabietic acids; but that the dehydroabietic acid may even be separated from such minor fraction.

With the foregoing general description of the process in mind, attention is now directed to certain variables and examples.

First note that the alkali to be employed in preparing the aqueous solution may be any of the alkali metal hydroxides and carbonates such as sodium hydroxide or sodium carbonate. As already indicated, the quantity of alkali present during the first phase of treatment, i. e., the phase for separation of neutrals, should be only sufficient to react with the rosin acids present. This, of course, will depend upon the particular rosin material being treated.

The presence of excess alkali at the time of the second phase of the treatment, i. e., the fractional acidification, is of no detriment, but would, of course, require the addition of more acid in order to reduce the pH value of the solution to the range in which the rosin acids may be precipitated.

For the purpose of extracting the neutrals after initial preparation of the solution of the sodium salts of the rosin acids, a non-polar solvent should be employed, such as ether.

The concentration of the rosin acid salts in the aqueous solution is not critical. It is preferred, however, to employ a dilute solution because this enables greater precision in the separation of rosin acids, for instance a concentration of from a fraction of 1% up to 10% based on the rosin acids. A concentration of from 3% to 5% has been found to be particularly effective.

A mineral acid should be used for the fractional acidification of the solution, for instance hydrochloric acid or sulfuric acid, hydrochloric acid being preferred. It is further preferred to use the acid in dilute form, say from 0.1 to 0.5 normal, advantageously 0.1 normal.

The amount of acid added at each stage of the frictional acidification will, of course, depend upon the fractions desired to be separated and this in turn will depend upon the proportions of the various rosin acids present in the mixture taken for treatment.

Efficient or thorough stirring should be used during the acid addition, since the precision of separation of the desired rosin acid fractions is thereby greatly enhanced.

All operations are effective at room temperature. There is no advantage at all in working at other temperatures in the first phase of treatment. However, the second phase may well be carried out at higher temperatures, even at the boiling point, during the addition of mineral acid and in this case each addition of mineral acid should be followed by cooling to room temperature before filtration. In this way the sharpness of the separation is enhanced by the additional factor of crystallization.

It is here further pointed out that the first phase of the treatment (separation of neutrals) may be applied not only to various disproportionated rosins, but even to other rosin materials where a separation of neutrals is desired.

In use of the invention for securing dehydroabietic acid in relatively pure form, any of a variety of disproportionated rosins may be selected as starting material. Thus, the type of product resulting from palladium-charcoal disproportionation may be used, or, if desired, dehydroabietic acid may be separated from rosin which has been disproportionated by heating in the presence of sulfur dioxide, as disclosed, for example, in Nicholas L. Kalman Patent No. 2,378,295.

EXAMPLES

*Example 1.*—This example illustrates the separation of neutrals from a disproportionated rosin.

Rosin disproportionated with palladium-charcoal was used in this example. The disproportionated material contained about 55% dehydroabietic acid, about 33% hydroabietic acids, and 12% neutrals. 34.1 g. of this disproportionated rosin (containing 30 g. of rosin acids, 0.1 mol, and 4.1 g. "neutrals") was ground in a mortar and then dissolved in 500 ml. of water and 205 ml. of 0.489 N, sodium hydroxide (0.1 mol sodium hydroxide) heated to 95° C. The solution was agitated and allowed to cool, thus yielding a turbid solution containing 3% rosin acids in the form of their sodium salts. This solution was then shaken with 800 ml. of ether and allowed to stand. The clear, almost colorless, aqueous layer was removed and the ether layer evaporated to dryness, yielding 4.6 g. of light brown, viscous oil. The aqueous solution was then shaken with 500 ml. of ether and separated. This time the ether extract gave 0.5 g. of a light yellow sticky solid. Vacuum and warming removed the ether dissolved in the aqueous solution, and complete acidification of a portion of this aqueous solution gave a white precipitate of mixed rosin acids, having acid number 181.

Additional batches of 150 g. and 175 g. of the same disproportionated rosin were worked up with the same results.

*Example 2.*—Neutrals were separated from another disproportionated rosin, as follows:

In this example a disproportionated rosin was prepared with the use of sulfur dioxide. 179.8 g. of this rosin (150 g. rosin acids, 0.5 mol and 29.8 g. "neutrals") was dissolved in the same manner described in Example 1 above in a solution containing 0.5 mol of sodium hydroxide and sufficient water to make 5 liters yielding a solution containing 3% of rosin acids in the form of their sodium salts. This was decanted from 1.9 g. of an insoluble, viscous oil found to be present. One liter of the decanted solution was shaken with 800 ml. of ether and separated. The ether layer contained 4.7 g. of an oily material. This portion of the aqueous solution was again extracted with ether, yielding an additional 0.7 g. of oil. On complete acidification of a portion of the extracted solution a fine white precipitate was obtained having an acid number of 170.

*Example 3.*—The following illustrates the fractional acidification of rosin disproportionated with palladium-charcoal and previously freed from neutrals in accordance with Example 1 above.

An aqueous solution having a total volume of 2500 ml. and containing 58.75 g. of the mixed rosin acids as their sodium salts (2.35% with respect to the acids) was subjected to fractional acidification, being efficiently stirred throughout. The initial pH of the solution was 10.85 and this was lowered by gradual addition of 0.103 N hydrochloric acid. The rate of addition varied between 0.5 and 2.5 ml. per minute, depending upon the amount of precipitation produced. After each minute of addition the flow of acid was stopped and the pH recorded following the lapse of another minute. During the acidification in which the first fraction was precipitated the pH of the solution decreased slowly to 8.6, at which point turbidity began to develop. On standing overnight the pH had risen to 9 and remained at this value throughout the precipitation of the first fraction. After filtration of this first fraction, the filtrate was acidified further, during which the pH sank to 8.65 with no precipitation. Further acid addition precipitated another fraction between pH readings of 8.65 and 8.55. Continuing in this manner a number of additional fractions were obtained, and the final fraction was precipitated by the addition of excess acid to remove completely all remaining rosin acid in the solution. The precipitates after filtration, were washed free of chloride ion with water, dried and weighed.

The quantity of precipitate secured in each of seven fractions according to the foregoing, and other pertinent data are given in Table I just below.

Table I

| Fraction | Pptg. pH | Precipitate | | HCl Added | |
|---|---|---|---|---|---|
| | | Wt. g. | Wt. Per Cent | Mls. | Per Cent |
| 1 | 9.05-9.00 | 21.1 | 36.2 | 700 | 36.8 |
| 2 | 8.65-8.55 | 13.2 | 22.6 | 383.5 | 20.2 |
| 3 | 8.60-8.50 | 2.1 | 3.6 | 46.5 | 2.4 |
| 4 | 8.60-8.20 | 3.4 | 5.8 | 103 | 5.4 |
| 5 | 8.20-7.90 | 12.6 | 21.5 | 422 | 22.2 |
| 6 | 7.90-7.20 | 4.1 | 7.1 | 145 | 7.6 |
| 7 | 7.20-2.50 | 1.9 | 3.2 | 300 | excess |
| | | 58.4 | 99.3 | | |

For identification purposes exactly equal amounts of each of the seven fractions, and also of an authentic sample of pure dehydroabietic acid, were esterified with excess dioazomethane in ether and any crystalline methyl dehydroabietate carefully isolated for yield and purity. The results of these esterifications are given in Table II just below.

Table II

| | Per Cent Yield of Methyldehydroabietate | M. P. ° C. |
|---|---|---|
| Dehydroabietic Acid | 96.0 | 61-62 |
| Fraction 1 | 0 | |
| Fraction 2 | 22.0 | 54-57 |
| Fraction 3 | 50.0 | 55-60 |
| Fraction 4 | 75.0 | 59-61 |
| Fraction 5 | 93.5 | 60.5-61 |
| Fraction 6 | 86.0 | 60-63 |
| Fraction 7 | 17.0 | 60-61 |

From the above it will be seen that fraction 5 is substantially pure dehydroabietic acid and that fractions 4 and 6 are mainly composed of this acid. A correction value of 4% may be added to the actual percentages of ester obtained for these three fractions, since the yield percentage of ester from pure dehydroabietic acid indicates 4% loss by ester solubility in the crystallizing solvent, methyl alcohol. It will be seen therefore that, based on the amount of methyl ester isolated from the three esterified fractions, 50-60% of the theoretical amount of dehydroabietic acid in the mixed acids has been separated in a state of purity sufficient for virtually any purpose.

*Example 4.*—This example illustrates fractional acidification of mixed rosin acids by the use of hydrochloric acid and sodium carbonate.

The mixed acids taken for treatment comprised about 63% dehydroabietic acid and 37% hydroabietic acids. A batch of 30 g. of the mixed acids was dissolved in 3000 ml. of water containing 10.7 g. of sodium carbonate. This formed a clear solution at room temperature and had an initial pH of 9.3.

The solution was brought to a boil and 0.1 N hydrochloric acid was added dropwise with stirring to the point of incipient turbidity, whereupon the solution was cooled to room temperature, resulting in precipitation and crystallization of a small fraction which was filtered, washed with water, and crystallized once from aqueous ethanol.

The filtrate was again raised to boiling temperature and hydrochloric acid again added in the manner described above to secure another small fraction. This fractionating treatment was repeated until no more precipitate was secured, and thereby 25 fractions were obtained.

The pH of the solution being fractionated was taken after each filtration, and it was found that the fractions precipitated between a pH of about 8.5 and about 7.5 (fractions 16 to 21 of the series) comprised substantially pure dehydroabietic acid. This was shown by combining this group of fractions and establishing the neutralization equivalent thereof, which was 298. Calculated for pure dehydroabietic acid: 298.

A sample of the above combined fractions was esterified with dimethyl sulfate in the usual manner, from which pure methyl dehydroabietate, of melting point 61-62° C., was obtained. A mixed melting point with authentic methyl dehydroabietate showed no depression.

It will be understood that where it is desired to separate dehydroabietic acid, without separation of other individuals with respect to each other, the fractional acidification may be carried out merely in two stages, instead of a multiplicity. When operating in this way, the quantity of acid added in the first stage of acidification should be sufficient to bring the pH value of the solution down to about 8.5. This will effect precipitation of the bulk of the acids present other than dehydroabietic acid. A second addition of acid may then be made to the solution sufficient to bring the pH down to about 7.5. This second stage of acidification will yield a precipitate constituting substantially pure dehydroabietic acid, the quantity of which will be over one-half of the total quantity of dehydroabietic acid initially present in the mixed acids taken for treatment.

Such two-stage fractional acidification has been effected under the general conditions fully outlined above, with results as to yield and purity of the same order as those indicated by the tables given above.

I claim:

1. The method of separating dehydroabietic acid from disproportionated rosin comprising dissolving disproportionated rosin in an aqueous alkaline solution to thereby form an aqueous solution of the alkali salts of the rosin acids present, adding mineral acid to the solution in an amount sufficient to react with the alkali salts of the hydroabietic acids present but insufficient to react with the alkali salts of dehydroabietic acid present, separating the resulting precipitate of hydroabietic acids, and thereafter recovering the dehydroabietic acid constituent from the solution.

2. A method according to claim 1 in which the addition of mineral acid is effected in two stages, the first of which is sufficient to reduce the pH value of the solution to 8.50 to thereby precipitate rosin acids other than dehydroabietic acid, and the second of which is sufficient to reduce the pH value of the remaining solution to 7.50 to thereby precipitate dehydroabietic acid.

3. The method of separating dehydroabietic acid from disproportionated rosin comprising separating neutral constituents from such rosin, reacting the rosin acids present with an alkali selected from the class consisting of alkali hydroxides and alkali carbonates in aqueous solution to thereby form an aqueous solution of the alkali salts of said acids, adding mineral acid to the solution in an amount sufficient to react with the alkali salts of the hydroabietic acids present but insufficient to react with the alkali salts of dehydroabietic acid present, separating the resulting precipitate of hydroabietic acids, and thereafter recovering the dehydroabietic acid constitutent from the solution.

4. A method according to claim 3 in which the disproportionated rosin is first dissolved in an aqueous alkaline solution and in which said separation of neutral constituents is effected from the solution of the alkali salts of the rosin acids.

5. A method according to claim 4 in which said separation of neutral constituents is effected by dissolving the disproportionated rosin in an aqueous alkaline solution containing substantially one gram equivalent weight of said alkali for each gram molecular weight of rosin acids present, and extracting the undissolved neutral constituents.

6. The method of separating substantially pure rosin acids from rosin materials containing such acids in admixture with neutral constitutents, which method comprises dissolving said rosin material in an aqueous alkaline solution containing a quantity of an alkali selected from the group consisting of alkali hydroxides and alkali carbonates substantially equal to but not greater than that quantity required to react with the rosin acids present to thereby form an aqueous solution of the alkali salts of the rosin acids having the neutral constituents suspended therein, extracting the solution with ether, and thereafter recovering the rosin acid constituents.

7. A method according to claim 6 in which the recovery of the rosin acid constitutents is effected by fractional acidification of the solution after extraction of the neutrals.

HAROLD H. ZEISS.

REFERENCES CITED

The following references are of record in the file of this patent:

UNITED STATES PATENTS

| Number | Name | Date |
|---|---|---|
| 1,940,372 | Sandquist | Dec. 19, 1933 |

OTHER REFERENCES

Fieser et al.: Jr. Amer. Chem. Soc., vol. 60, pp. 2631–2636, November 1938.